R. T. GRIFFITHS.
MOLD FOR THE MANUFACTURE OF RUBBER GLOVES.
APPLICATION FILED FEB. 8, 1917.

1,225,028.

Patented May 8, 1917.
3 SHEETS—SHEET 1.

Inventor:
Richard T. Griffiths
Atty's.

R. T. GRIFFITHS.
MOLD FOR THE MANUFACTURE OF RUBBER GLOVES.
APPLICATION FILED FEB. 8, 1917.

1,225,028.

Patented May 8, 1917.
3 SHEETS—SHEET 2.

Inventor:
Richard T. Griffiths
Att'ys

R. T. GRIFFITHS.
MOLD FOR THE MANUFACTURE OF RUBBER GLOVES.
APPLICATION FILED FEB. 8, 1917.
1,225,028.
Patented May 8, 1917.
3 SHEETS—SHEET 3.
Fig. 6.
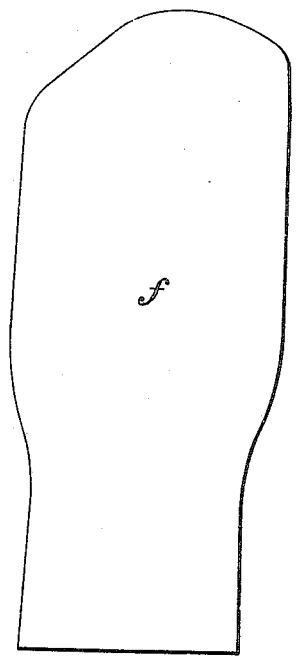
Fig. 7.
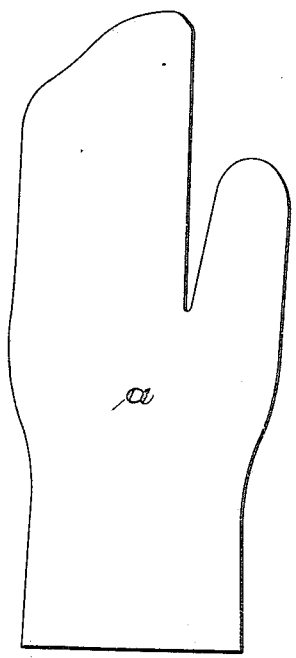
Fig. 8. Fig. 9.
 
Fig. 10.
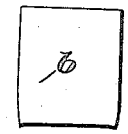
Fig. 11.
Inventor:
Richard T. Griffiths
Spear Middleton Donalds & Spear
Atty's.

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

MOLD FOR THE MANUFACTURE OF RUBBER GLOVES.

1,225,028.

Specification of Letters Patent.

Patented May 8, 1917.

Original application filed July 10, 1916, Serial No. 108,341. Divided and this application filed February 8, 1917. Serial No. 147,484.

*To all whom it may concern:*

Be it known that I, RICHARD T. GRIFFITHS, a citizen of the United States, and resident of Akron, Ohio, have invented certain new and useful Improvements in Molds for the Manufacture of Rubber Gloves, of which the following is a specification.

This application is a division of an application filed by me in the U. S. Patent Office on the 10th day of July, 1916, Serial Number 108,341.

My present invention relates to improvements in the manufacture of rubber gloves and more especially to such gloves as are designed for use by electricians to prevent their receiving injurious shocks from contact with live wires and the like, although not limited to such use. Prior to my invention such gloves, so far as I am aware, have been manufactured by the process of dipping a properly shaped form simulating the hand in a rubber solution which adheres to the form and is subsequently vulcanized thereon, the requisite thickness of rubber upon the form being secured by repeated dippings.

This method has not been found to be altogether satisfactory, especially in gloves used by electricians, as it is absolutely impossible to preclude the entrapping of air or the formation of bubbles in the deposited layers, especially between the fingers and at the finger extremities; such blisters or imperfections being liable to permit the passage of electric currents, giving the workman severe shocks or burns. It is furthermore difficult in the manufacture of dipped gloves to thicken the gloves at the points where most strength or thickness is required.

In producing a molded glove considerable difficulty is experienced, owing to the shape of the article to be produced, in that the thumb must be positioned in opposition to the fingers and spaced therefrom to produce a satisfactory article and the material cannot be poured into the mold in the form of a fluid, as in metal founding, but must be applied in the form of sheets of unvulcanized rubber compound as it comes from the rubber calenders.

By my present method and apparatus I have produced a glove of a strong, durable and homogeneous character, and free from the defects which have heretofore existed in articles of this character.

The invention includes the novel method, and apparatus hereinafter described and particularly defined by the appended claims.

The invention will be explained by the aid of the accompanying drawings, in which, Figure 1 is an inside face view of one of the main mold sections.

Figs. 6 to 11 are plan views of the pieces of sheet rubber or blanks which I have found by experience to be a convenient and, in fact, my preferred manner of applying the rubber to the mold.

Figure 1:
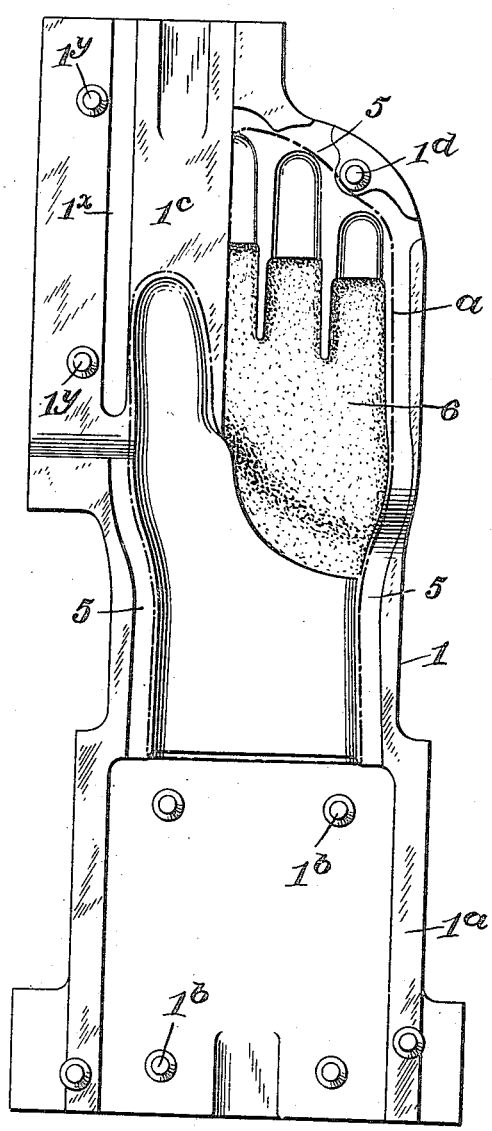

Referring first to the apparatus for molding the glove, this, as shown in the drawings, comprises four parts numbered respectively 1, 2, 3 and 4. The part indicated at 2 is the core part which has a portion shaped to correspond to the hand with the thumb opposed to the forefinger but spaced therefrom, this core having a flat end portion 2ª designed to be clamped between corresponding parts 1ª and 4ª of the mold sections 1 and 4 so as to hold the core properly spaced from the cavities in the mold sections. The mold sections 1ª and 4ª are provided with pins or projections 1ᵇ and 4ᵇ which engage corresponding recesses 2ᵇ in the base of the core to secure proper alinement. Mold section 1 has a main cavity shaped to form the palm portion of the hand and wrist and the corresponding portions of the little and ring fingers and of half of the middle finger as shown, and it will be noted that the portion which forms the thumb is depressed below the finger bearing portion of the mold section lying, as it does, in a cut-away portion 1ᵉ of the mold section. This cut-away portion is occupied by the section 3. For convenience in description, I will refer to the mold section 1 as the bottom section and the mold section 4 as the top section. The under face of the intermediate, or supplemental section 3, which fits against the recessed face 1ᶜ, is provided with a thumb recess, as shown, which coöperates with the thumb forming recess of the mold section 1. The upper face of the section 3 bears the remaining portion of the middle finger forming recess and also the recess for the index finger, so that when the section 3 is in place upon the section 1 its upper face lies in the same plane as the portion of the section 1 which bears the finger grooves and completes the lower half of the finger forming portion.

The thumb recess in the under face of the section 3 forms the balance of the thumb, while the under face of the top section 4 of the mold is properly shaped to form the back of the hand and wrist. To secure proper alinement of the mold sections, the under face of section 3 is provided with a rib 3ˣ which is designed to engage a corresponding groove 1ˣ in the section 1 and is provided also with holes or recesses 3ʸ which are engaged by pins 1ʸ in the mold section 1. The opposite or upper face is likewise provided with a rib 3ᶻ, which is designed to engage a corresponding rib 4ᶻ in the under face of the section 4, and the openings 3ʸ pass completely through the section 3 and aline with corresponding openings 4ˣ in the section 4 which allows the pin 1ʸ to connect all three sections. One or more other pins 1ᵈ may be provided on one of the sections, such as the bottom section 1, for engaging a corresponding opening or recess 4ᶜ in the section 4.

Figure 2:
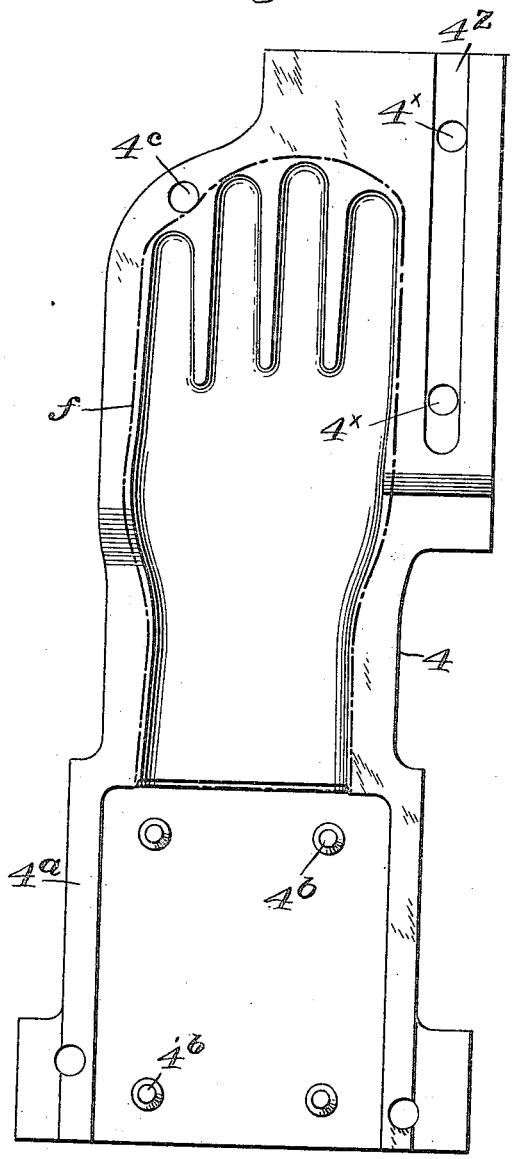
Fig. 2 is a similar view of the inside face of the other mold section.
Figure 3:
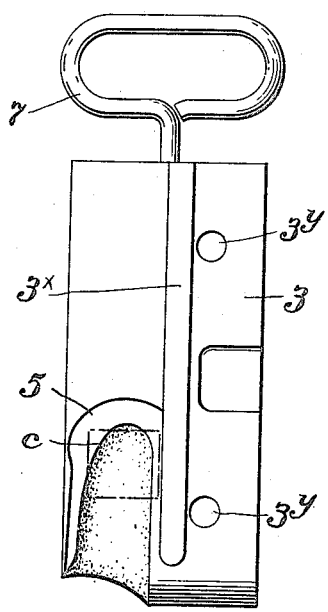
Figs. 3 and 4 are respectively views of the opposite faces of an intermediate mold section, Fig. 3 showing the face which, when in assembled position, abuts against the face of the section shown in Fig. 1, and Fig. 4 showing the face which, in assembled position, abuts against the face of the mold section shown in Fig. 2.
Figure 5:
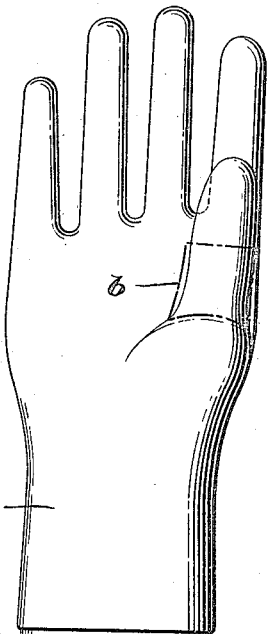
Fig. 5 is a face view of the core.
Figure 4:
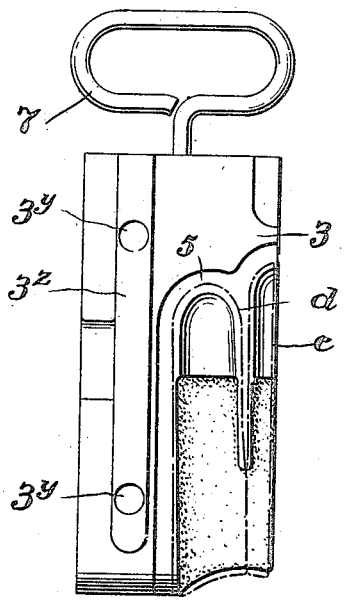

As heretofore stated, it is desirable to form the glove from previously calendered sheets of suitable rubber compound and by that I mean crude rubber mixed with the necessary vulcanizing material, such as sulfur, and such other ingredients as are found desirable, such sheets being unvulcanized and hence in a plastic condition. Owing, however, to the peculiar shape of the article to be molded, I have found it inexpedient, or inconvenient, to use two sheets forming the opposite halves of the glove. The most convenient and effective method which I have found for using my improved mold, is to cut from a sheet of rubber compound six pieces of the shape shown in Figs. 6 to 11 inclusive, comprising two main sections, one of which resembles generally in shape the back of a mitten and the other the palm portion of a mitten, but with the finger portion thereof considerably narrower than the corresponding portion of the other section. For convenience of illustration and to facilitate the understanding of my invention, I have indicated in dotted lines the position of the several pieces of rubber on the mold sections as they would appear before the mold sections are assembled. From this it will appear that the piece $a$ is laid upon the mold part 1, as indicated by said dotted lines. The core part 2 is then laid in proper position upon the part 1 and the small piece of rubber $b$ is pressed against the inside of the thumb portion of the core in a position indicated by dotted lines in Fig. 5. The other small piece $c$ is placed at the extremity of the thumb cavity of the mold section 3 and this mold section 3 is then placed in position between the thumb portion of the core 2 and the mold section 1. The face, or side, of the mold section 3, shown in Fig. 4 will now be uppermost and the pieces of rubber $d$ and $e$ are placed over this in the position indicated by the dotted lines. The piece or section $f$ is then placed in proper position overlying the back of the core, though, for convenience in illustrating its position, I have placed a dotted line showing it on the mold section in Fig. 2. The mold section 4 is then applied in position and the completely assembled mold is placed in a hydraulic press where it is subjected to heat and pressure for vulcanizing in the ordinary manner.

It will be understood that while I have described certain specific pieces as what I regard as the most convenient and expeditious manner of forming the glove, I do not wish to be limited to this particular number of pieces or their exact shape.

When the heat and pressure is applied and before the vulcanization has actually proceeded, the first action of the heat is to soften the rubber and the pressure causes it to flow or distribute itself so that all portions of the space between the core and the mold are filled and the edges of the separate pieces come into intimate and homogeneous relation, so that when the vulcanization is complete the resultant article is a complete and homogeneous glove. By reason of its being vulcanized under strong pressure, the glove is absolutely free from blisters or imperfections of any kind.

To secure the best results, a slight excess of rubber necessarily results and to provide for the escape of this, the mold sections are provided with grooves or channels, indicated at 5, which are parallel with the edge of the finger and wrist portions as shown, and into which channels the excess of softened rubber is crowded when the pressure is applied.

In a glove especially designed for the use of electricians, it is desirable to have the inside of the thumb and fingers and the palm portion, or in other words the grasping part of the glove, thicker than the remaining parts.

To accomplish this, I slightly rabbet the corresponding portions of the mold sections, and said portions are also preferably roughened, as indicated at 6, which produces a correspondingly roughened surface in the completed glove and enables the user to grasp articles more firmly than with the smooth rubber surface.

Mold section 3 is preferably provided with a handle, indicated at 7, to facilitate its insertion into position.

Having thus described my invention what I claim is:

1. In combination a core conforming in shape to that of a hand with the thumb opposed to but spaced from the index finger, mold sections for the front and back of the hand, and an intermediate mold section for fitting in the space between the thumb and index finger.

2. In combination a core shaped to conform to a hand, and complementary mold sections, the mold section corresponding to the palm of a hand having a rabbeted portion to produce a thickened grasping portion in the glove.

3. In combination a core shaped to conform to a hand and complementary mold sections, the mold section corresponding to the palm of a hand having a roughened portion to produce a roughened grasping portion in the glove.

In testimony whereof I affix my signature.

RICHARD T. GRIFFITHS.

Witnesses:
C. A. WOLF,
C. H. WHONALL.

Copies of this patent may be obtained for five cents each, by addressing the "Commissioner of Patents, Washington, D. C."